United States Patent
Hsieh

(10) Patent No.: US 8,560,740 B2
(45) Date of Patent: Oct. 15, 2013

(54) KEYBOARD EQUIPPED WITH SWITCHING INTERFACES

(75) Inventor: Yu-Chen Hsieh, New Taipei (TW)

(73) Assignee: Zippy Technology Corp., New Taipei (TW)

( * ) Notice: Subject to any disclaimer, the term of this patent is extended or adjusted under 35 U.S.C. 154(b) by 0 days.

(21) Appl. No.: 13/156,831

(22) Filed: Jun. 9, 2011

(65) Prior Publication Data

US 2012/0317329 A1    Dec. 13, 2012

(51) Int. Cl.
 G06F 3/00    (2006.01)
 G06F 13/12    (2006.01)
 G06F 13/38    (2006.01)

(52) U.S. Cl.
 USPC .................................. 710/14; 710/8; 710/73

(58) Field of Classification Search
 USPC ................................................ 710/14, 8, 73
 See application file for complete search history.

(56) References Cited

U.S. PATENT DOCUMENTS

| 2006/0072287 A1* | 4/2006 | Kwong et al. | 361/683 |
| 2010/0265179 A1* | 10/2010 | Ram | 345/163 |
| 2011/0208725 A1* | 8/2011 | Owens et al. | 707/723 |

* cited by examiner

Primary Examiner — Idriss N Alrobaye
Assistant Examiner — Zachary K Huson
(74) Attorney, Agent, or Firm — Muncy, Geissler, Olds & Lowe, PLLC

(57) ABSTRACT

A keyboard equipped with switching interfaces includes a key set module, a circuit unit, a wired transmission interface, a wireless transmission interface and a switch unit. The key set module includes a plurality of keys depressible by users to trigger the circuit unit to generate a message signal. The circuit unit is electrically connected to the wired transmission interface and wireless transmission interface. The wired transmission interface is electrically connected to a transmission cable to output therethrough. The switch unit is electrically connected to the circuit unit and triggers the circuit unit to output the message signal to the wired transmission interface or wireless transmission interface according to user's actions.

5 Claims, 3 Drawing Sheets

KEYBOARD EQUIPPED WITH SWITCHING INTERFACES

FIELD OF THE INVENTION

The present invention relates to a keyboard equipped with switching interfaces and particularly to a keyboard equipped with a plurality of output interfaces to allow users to decide and switch the output interfaces.

BACKGROUND OF THE INVENTION

Keyboard is an important device for communication between people and technology, and commonly used as a communication interface with computers or other digital devices. With progress of technology, different types of linkage have been developed to the keyboard.

Initially linkage between the keyboard and computer adopted a communication interface standard of RS-232/DB-9, then advanced to PS/2 communication interface, and finally has progressed to USB communication interface now with greatest compatibility, which adopts wired connection. However, as applications of computers and digital devices have gradually personalized and entered into people's daily life, application environments are no longer limited to office desks or computer tables. Naturally linkage between the keyboard and computers or digital devices also evolves from the wired connection within a limited distance to wireless connection within a wider area.

To meet wireless transmission requirement on the keyboard, infrared transmission technique was first widely adopted. However, infrared transmission is directional and a smooth high speed connection of the infrared transmission often is limited to a short distance within few meters and obstacles therebetween. Hence these cause strict limitations on use angles and distance of the wireless keyboard. As a result, infrared-enabled keyboard is not well received by most users and has gradually faded out from the market.

In recent years, plenty of electronic industries have set up a common wireless communication standard of Bluetooth communication technology. It not only increases the linking distance, but also overcomes use angle problem and provides greater compatibility. Aside from being adopted on mobile communication field, it also has been expanded to keyboard, mouse and game machine fields.

However, take the Bluetooth keyboard to be used as an input device, the system (such as computer or mobile phone) receiving Bluetooth keyboard signals must have a Bluetooth transmission module to establish a linkage with the Bluetooth keyboard. But the Bluetooth transmission module is not yet a built-in device in the general computer. Hence even if a user carries a Bluetooth keyboard, it does not mean the Bluetooth keyboard can establish a linkage with any devices whenever desired. This causes use limitation.

SUMMARY OF THE INVENTION

In view of the conventional Bluetooth transmission module that is not built in the computer to make direct connection between a Bluetooth keyboard and most computer systems impossible and result in use limitation, the primary object of the present invention is to provide an improved keyboard equipped with both a wireless transmission interface and a wired transmission interface at the same time, and a control mechanism in the keyboard to allow users to select a signal transmission linkage so that the users can determine the transmission interface according to connecting objects or use environments of the keyboard to improve usability.

The present invention aims to provide a keyboard equipped with switching interfaces. The keyboard includes a key set module, a circuit unit, a wired transmission interface, a wireless transmission interface and a switch unit. The key set module includes a plurality of keys depressible by users to trigger the circuit unit to generate a message signal. The circuit unit is electrically connected to the wired transmission interface and wireless transmission interface. The wired transmission interface also is electrically connected to a transmission cable to output. The switch unit also is electrically connected to the circuit unit and triggers the circuit unit to send the message signal to the wired transmission interface or the wireless transmission interface according to user's action.

The aforesaid wired transmission interface can be a USB transmission interface or a SATA transmission interface. The wireless transmission interface is a Bluetooth transmission interface. The circuit unit can include a micro-control unit to process signals and generate the message signal. The switch unit can be selected to directly connect to the micro-control unit and generate an electrical signal by switching to trigger the micro-control unit to output through the wired transmission interface or wireless transmission interface. In another embodiment, the switch unit can select the wired transmission interface or wireless transmission interface which is electrically connected to the micro-control unit to output the message signal according to action status of the switch unit. The keyboard further may include a charge unit electrically connected to the wired transmission interface to receive external electric power via the transmission cable so that the keyboard can have electric power for operation when the wireless transmission interface is in use.

By means of the technique set forth above, the keyboard can support both the wired transmission and wireless transmission simultaneously, and determine which interface to be used according to use environment or user's preference. Thus different interfaces can be connected to different external devices. By switching the transmission interfaces, output objects of the keyboard can be chosen as desired.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

The present invention aims to provide a keyboard equipped with switching interfaces.

Figure 1:
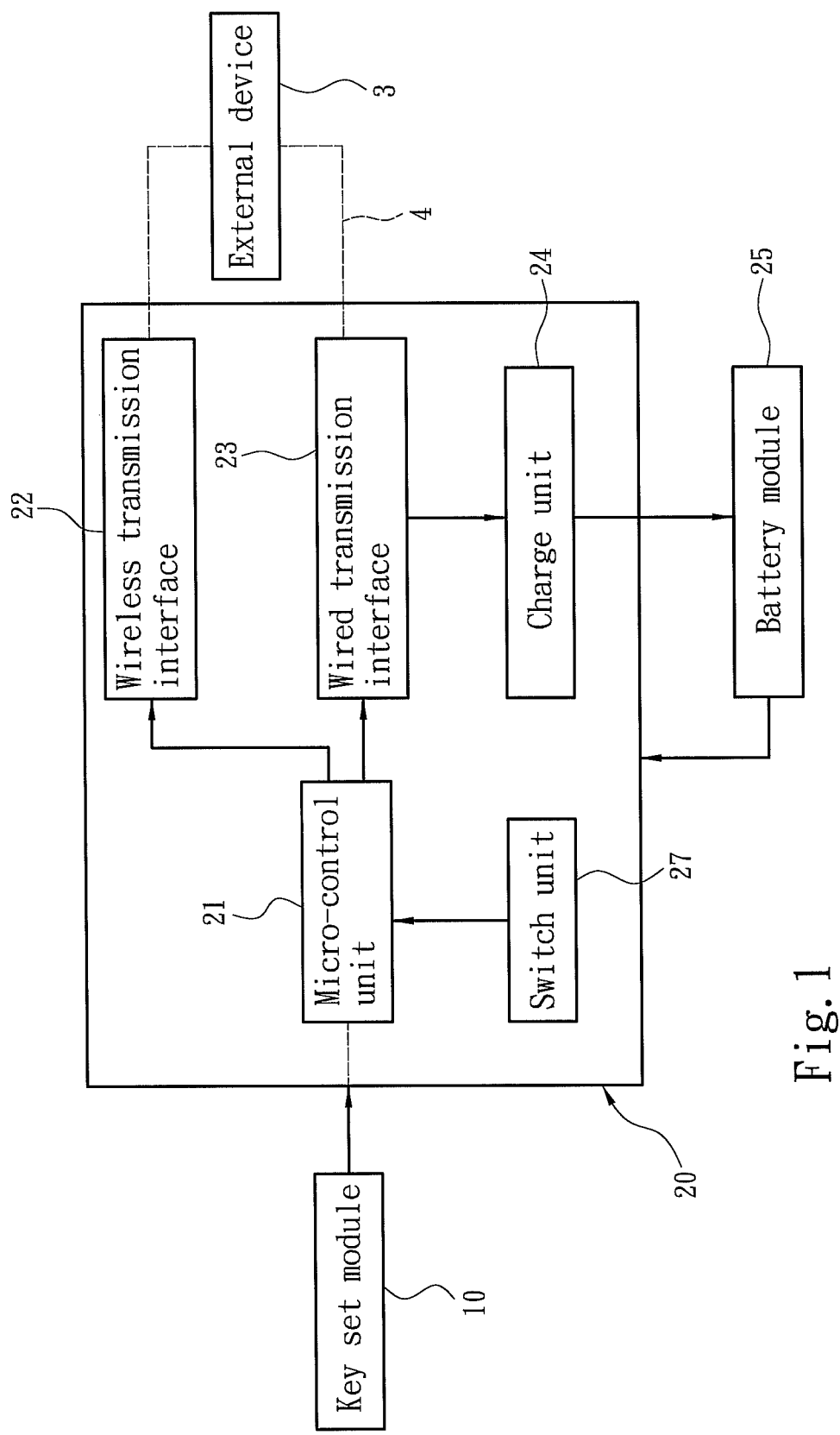
FIG. 1 is a circuit block diagram of an embodiment of the invention.
Figure 2:
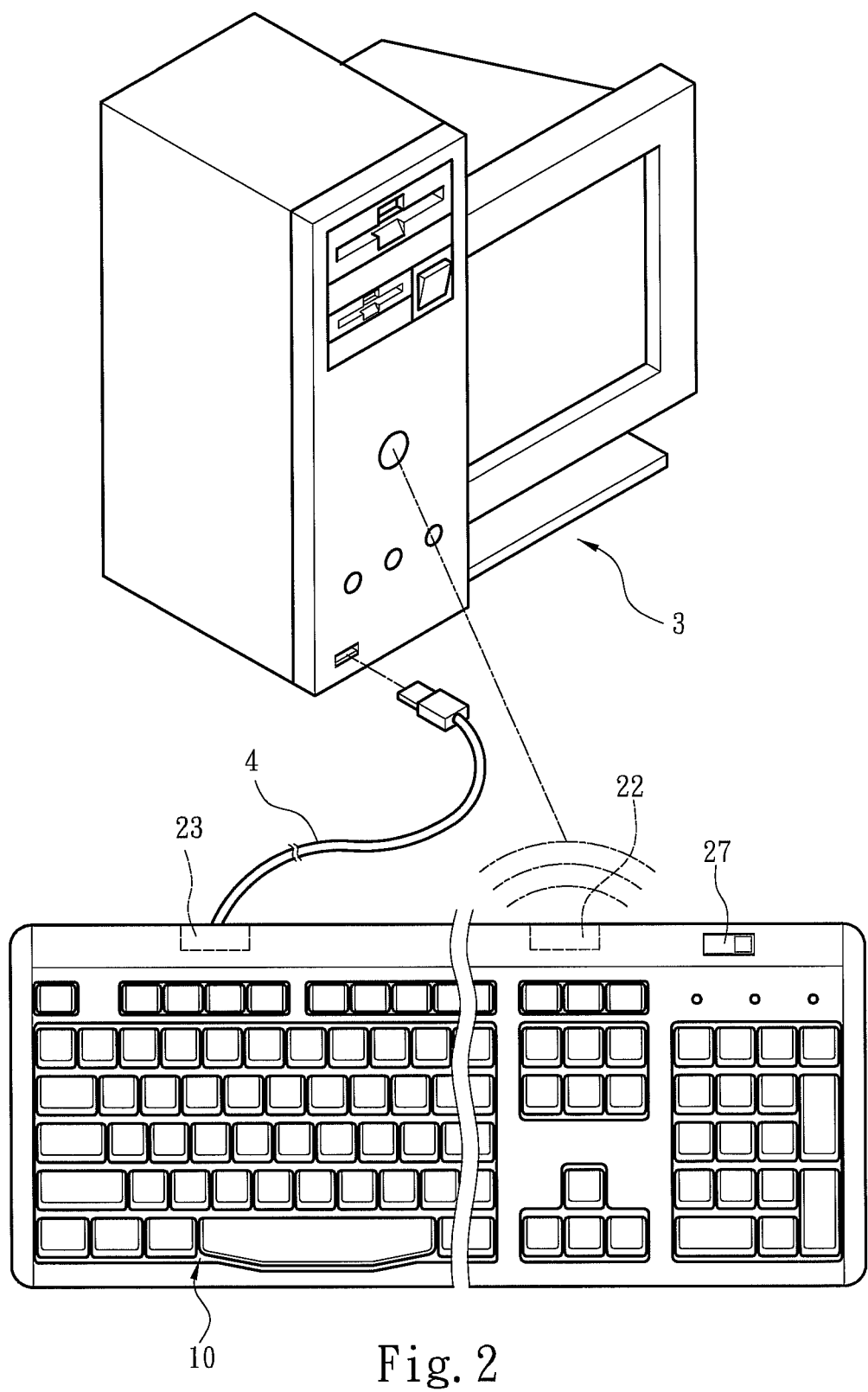
FIG. 2 is a schematic view of an embodiment of the keyboard of the invention.

Please refer to FIGS. 1 and 2 for an embodiment of the invention. The keyboard of the invention includes a key set module 10 and a circuit unit 20. The key set module 10 includes a plurality of keys installed on a keyboard housing. The circuit unit 20 is located in the keyboard housing. The keys are depressible to trigger the circuit unit 20 to generate a message signal. The structure and principle of the keyboard housing and key movements are known in the art, thus are not marked in the drawings and details thereof also are omitted herein. The circuit unit 20 further is electrically connected to a wireless transmission interface 22 and a wired transmission interface 23 which is also electrically connected to a transmission cable 4 to transmit signals back and forth with an external device 3. The wireless transmission interface 22 can establish a wireless transmission linkage with the external device 3 which supports wireless transmission. Through the wireless transmission interface 22 and wired transmission interface 23, the keyboard can send the message signal input by users to the external device 3. Furthermore, the circuit unit 20 further includes a micro-control unit 21 which usually is an integrated circuit chip on the circuit unit 20. After the circuit unit 20 is triggered by the key set module 10, the micro-control unit 21 performs signal processing and outputs the message signal. The message signal output by the micro-control unit 21 can be selectively sent to the wireless transmission interface 22 or wired transmission interface 23. The keyboard further includes a switch unit 27 electrically connected to the circuit unit 20. The switch unit 27 is operated by the user's to trigger the circuit unit 20 to output the message signal to the wired transmission interface 23 or wireless transmission interface 22. The installation location and linking relationship of the switch unit 27 are shown in FIG. 1. The switch unit 27 generates an electrical signal to trigger the micro-control unit 21 according to the switching conditions thereof. When the switch unit 27 is switched to a first state according to user's action, the micro-control unit 21 is triggered to output the message signal to the wireless transmission interface 22 which sends the signal to the external device 3. Similarly, when the switch unit 27 is switched to a second state according to user's another action, the micro-control unit 21 is triggered to output the message signal to the wired transmission interface 23 which sends the signal to the external device 3 through the transmission cable 4. Referring to FIG. 2, the switch unit 27 can be a manual switch, button switch, or other types of switches known by those skilled in the art.

Figure 3:
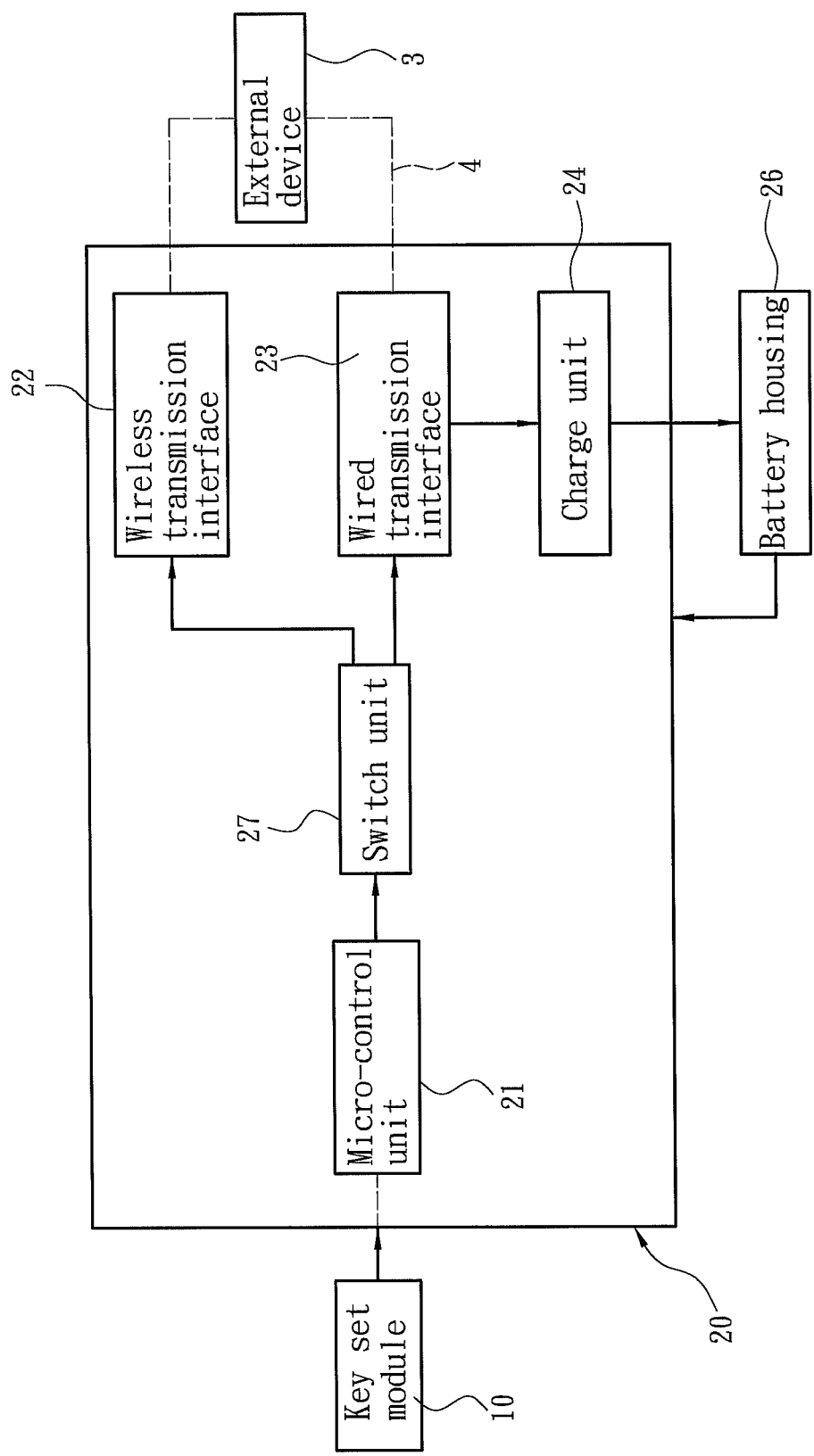
FIG. 3 is a circuit block diagram of another embodiment of the invention.

The installation location and linking relationship of the switch unit 27 also are adjustable as shown in FIG. 3, in which the switch unit 27 bridges the micro-control unit 21 and wireless transmission interface 22 and wired transmission interface 23. Hence through user's actions to the switch unit 27, the message signal can be selectively sent to the wireless transmission interface 22 or wired transmission interface 23.

Also referring to FIG. 1, when the keyboard is connected to the external device 3 through the wireless transmission interface 22, it requires self-contained power supply to support operation of circuit elements in the keyboard. The keyboard also includes a charge unit 24 electrically connected to the wired transmission interface 23. When the wired transmission interface 23 is connected to the external device 3, the wired transmission interface 23 gets external power and supplies the power to the charge unit 24 which in turn charges a battery module 25 built in the keyboard. The battery module 25 is electrically connected to the circuit unit 20 to supply electric power for operation of the keyboard when the wireless transmission interface 22 is activated.

Referring to FIG. 3, the keyboard can also include a battery housing 26 electrically connected to the circuit unit 20. The charge unit 24 is electrically connected to the battery housing 26 which holds replaceable batteries available on the market. The batteries also can supply power for normal operation when the wireless transmission interface 22 is activated.

The aforesaid wireless transmission interface 22 is preferably a Bluetooth transmission module, while the wired transmission interface 23 is a USB transmission interface or a SATA transmission interface. Through the techniques mentioned above, the keyboard can support both wired transmission and wireless transmission at the same time. Users can determine which interface to be used according to use environments or their preferences. Through the characteristic of multiple interfaces, different interfaces can be connected to different external devices. By switching the transmission interfaces, output objects of the keyboard can be selected.

While the invention has been described by means of specific embodiments, numerous modifications and variations could be made thereto by those skilled in the art without departing from the scope and spirit of the invention set forth in the claims.

In summation of the above description, the present invention provides a significant improvement over the conventional techniques and complies with the patent application requirements, and is submitted for review and granting of the commensurate patent rights.

What is claimed is:

1. A keyboard capable of switching interfaces, which is electrically connected with an external device, comprising:
a key set module including a plurality of keys depressible by users;
a circuit unit which is triggered by depression of the keys to generate a message signal and includes a micro-control unit to perform signal processing and output the message signal;
a wired transmission interface with one side electrically connected to the micro-control unit and another side electrically connected to the external device through a transmission cable to output the message signal therethrough;
a wireless transmission interface electrically connected to the micro-control unit; and
a switch unit which is located on the key set module and electrically connected to the micro-control unit, and is activated by manual operation of the user to trigger the micro-control unit to selectively output the message signal to the external device through the wired transmission interface or through the wireless transmission interface; and
a charge unit electrically connected to the wired transmission interface and a battery module built in the keyboard and electrically connected to the charge unit, wherein the wired transmission interface receives external power via the transmission cable and supplies the power to the charge unit, and wherein the charge unit charges the battery module through the received external power so that the battery module supplies the power required by the keyboard when the wireless transmission interface is activated.

2. The keyboard of claim 1, wherein the wireless transmission interface is a Bluetooth transmission module.

3. The keyboard of claim 1, wherein the wired transmission interface is a Universal Serial Bus (USB) transmission interface.

4. The keyboard of claim 1, wherein the wired transmission interface is a Serial Advanced Technology Attachment (SATA) transmission interface.

5. A keyboard capable of switching interfaces, which is electrically connected with an external device, comprising:
a key set module including a plurality of keys depressible by users;

a circuit unit which is triggered by depression of the keys to generate a message signal and includes a micro-control unit to perform signal processing and output the message signal;

a switch unit located on the key set module and electrically connected to the micro-control unit;

a wired transmission interface with one side electrically connected to the switch unit and another side electrically connected to the external device through a transmission cable to output the message signal therethrough;

a wireless transmission interface with one side electrically connected to the switch unit and another side electrically connected to the external device; and a charge unit electrically connected to the wired transmission interface and a battery module built in the keyboard and electrically connected to the charge unit, wherein the wired transmission interface receives external power via the transmission cable and supplies the power to the charge unit, and wherein the charge unit charges the battery module through the received external power so that the battery module supplies the power required by the keyboard when the wireless transmission interface is activated;

wherein the switch unit is activated by manual operation of the user to determine whether the wired transmission interface or the wireless transmission interface is electrically connected to the micro-control unit to output the message signal to the external device.

\* \* \* \* \*